Figures 1, 2:
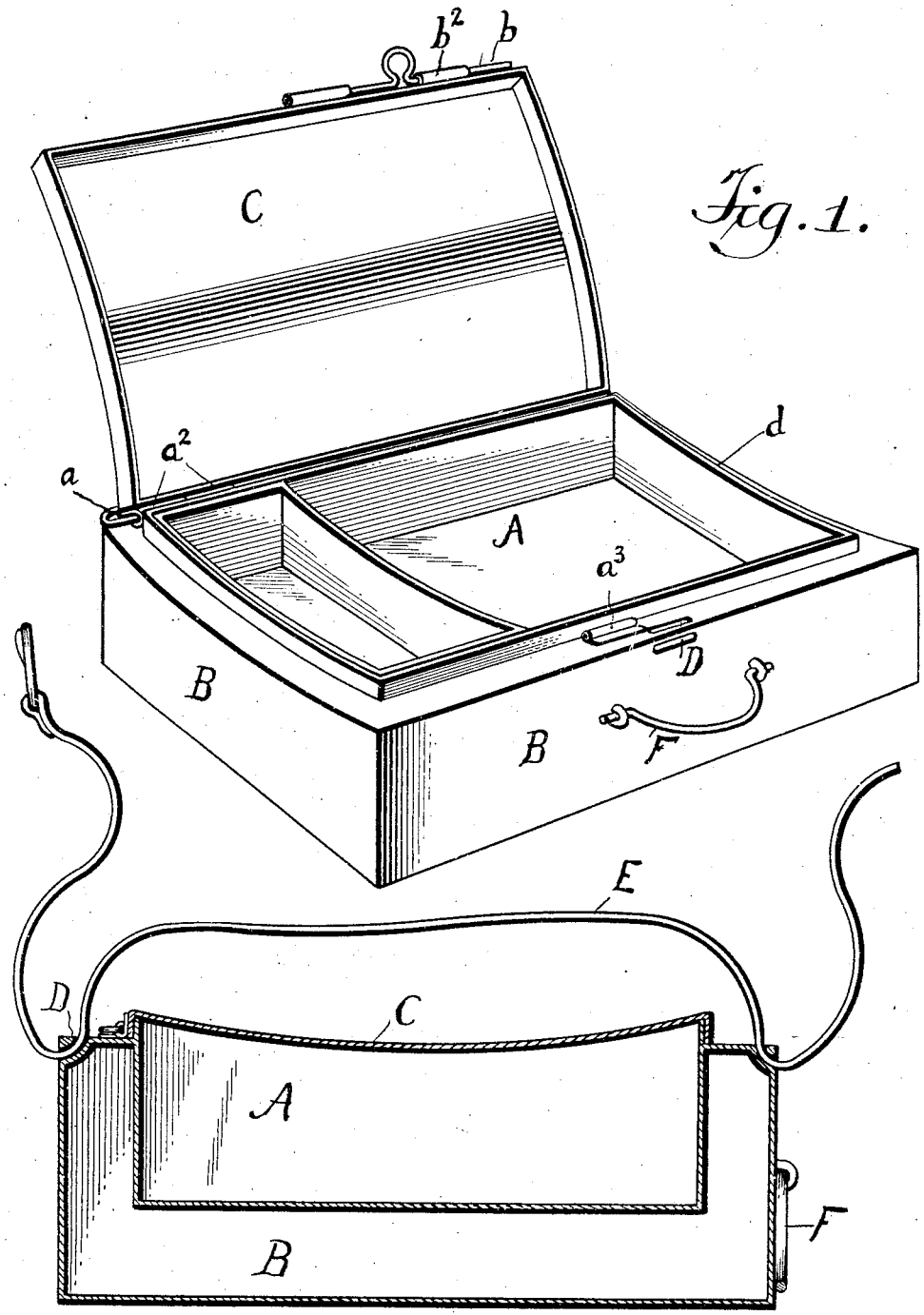

No. 784,933. PATENTED MAR. 14, 1905.
W. FISCH.
COMBINED FISHERMAN'S BOX AND LIFE PRESERVER.
APPLICATION FILED AUG. 4, 1904.

Witnesses
Inventor
William Fisch
By his Attorney

No. 784,933. Patented March 14, 1905.

UNITED STATES PATENT OFFICE.

WILLIAM FISCH, OF NEW YORK, N. Y.

COMBINED FISHERMAN'S BOX AND LIFE-PRESERVER.

SPECIFICATION forming part of Letters Patent No. 784,933, dated March 14, 1905.

Application filed August 4, 1904. Serial No. 219,508.

*To all whom it may concern:*

Be it known that I, WILLIAM FISCH, a citizen of the United States, residing in the city of New York, borough of Bronx, county and State of New York, have invented certain new and useful Improvements in a Combined Fisherman's Box and Life-Preserver, of which the following is a specification.

The invention has for its object to provide a box or receptacle more particularly adapted for the use of fishermen or persons traveling upon waterways, which will combine the features of a handy box adapted to contain food or the like and which may at the same time be utilized, in case of necessity, as a life-preserver, as will be hereinafter explained.

To this end the invention consists in the novel features of improvement hereinafter set forth, and finally pointed out in the appended claims.

Reference is to be had to the accompanying drawings, forming part of this specification, wherein—

Figure 1 is a perspective view of a box or receptacle embodying my invention, the lid being opened; and Fig. 2 is a transverse sectional view thereof, the lid being closed.

Referring to the accompanying drawings, A indicates the box proper, the same being surrounded at its four sides and bottom by an air-tight chamber B, and a detachable cover C is provided adapted to close the box. The cover C is preferably hinged to the box in such manner that it may readily be removed therefrom, as by means of a pintle $a$, frictionally engaging sleeves $a^2$ upon the box and edge of the cover, and the cover is locked, when closed, by means of a locking-pin $b$, frictionally held in sleeves $b^2$ upon the outer edge of the cover, entering a sleeve $a^3$ upon the box and frictionally held therein. By this means the cover may readily be detached. The box may be divided into a plurality of compartments, as shown. At opposite edges of the outer shell of the air-tight chamber I provide slots D, through which is adapted to pass a strap or band E for the purpose of attaching the box to the body of a person when the same is employed as a life-preserver, the strap being provided with suitable fastening devices. The lid or cover C is preferably slightly concaved, so that when the box is applied to the chest as a life-preserver it will more snugly fit thereon, the box for this purpose being vertically applied to the chest and tightly strapped thereto. If preferred, however, and to make the box more buoyant, the lid or cover C can readily be detached, as above described, and contents emptied, in case of emergency, within a few moments, and the box, minus the cover, attached to the chest in a manner as just described, the opposite ends of the box at the top edges thereof being slightly concaved, as at $d$, for purpose of snugly fitting the chest in manner hereinbefore mentioned. A suitable grip or handle F is provided at the side of the box. The entire box and surrounding air-tight chamber is preferably made of light sheet-tin, but may be constructed of other light waterproof material.

I have found in practice that the box described when used as a life-preserver in manner described will keep a body of considerable weight from sinking.

Having now described my invention, what I claim, and desire to secure by Letters Patent, is—

1. A box or receptacle provided with an air-tight chamber surrounding its sides and bottom, a slightly-concaved lid or cover detachably secured to the box, and means for attaching the same to the body, substantially as described.

2. A box or receptacle provided with an air-tight chamber surrounding its sides and bottom, a lid or cover detachably secured to the box, and means for attaching the same to the body, said means comprising a strap passing through slots in the edges of the box, substantially as described.

WILLIAM FISCH.

Witnesses:
HASKEL CORENTHAL,
SAMUEL SWANSON.